Patented July 20, 1948

2,445,367

UNITED STATES PATENT OFFICE 2,445,367

METHOD OF STABILIZING HYDROCARBONS

Richard F. Robey, Cranford, John Fedirko, Elizabeth, and Allan E. Barnett, Westfield, N. J., assignors to Standard Oil Development Company, a corporation of Delaware No Drawing. Application May 26, 1944,
Serial No. 537,540

6 Claims. (Cl. 260—666.5)

This invention relates to a method of stabilizing hydrocarbon materials and particularly to a method of reducing the peroxide content of hydrocarbons or preventing the formation of peroxides in hydrocarbons which are exposed to air or oxygen.

It is well known that the presence of peroxides in petroleum hydrocarbons of the motor fuel range tends to induce the formation of gums and to increase the knocking tendencies of motor fuels. Peroxides have also been found to promote deterioration of petroleum lubricating oils, causing bearing corrosion in the absence of oxygen. It is also known that the presence of peroxides is particularly undesirable in hydrocarbons of the diolefin type, since the diolefins tend to polymerize comparatively rapidly in the presence of small quantities of peroxides, whereby rubber-like polymers are formed during storage. The present invention relates particularly to the use of additives which materially inhibit the spontaneous formation of peroxides and which will reduce the peroxide content of hydrocarbon materials when the peroxides are already present. The invention is particularly concerned with the reduction of the peroxide content of diolefins.

Studies of the reactions which butadiene, isoprene, cyclopentadiene, the piperylenes, and their higher homologs undergo during storage and the plant processing indicate that there are two types of polymerization which may take place. One type is the dimerization by a Diels-Adler type condensation, which is bimolecular and homogeneous in the liquid phase under a variety of conditions. The second type of polymerization, the formation of plastic materials of high molecular weight, is more serious, since, if such polymerization is permitted to proceed without control, not only will severe losses of valuable material result both in storage and in operations such as distillation, but stoppage of equipment will also be caused by solid polymer masses. It has been found that this type of polymerization is catalyzed by peroxides. Peroxides of the diolefins may be formed by air oxidation, and the rate of polymerization to plastic substances is related to the peroxide concentration. Certain antioxidants have been found to be quite effective in preventing such peroxide formation, the most useful being the antioxidants of the phenolic type which have aliphatic side chains which render the compounds at least moderately soluble in the hydrocarbons. In some cases the side chain is not required. For example, it has been demonstrated that the presence of hydroquinone practically completely prevents appreciable peroxidation of butadiene by air for a considerable period, and further observations indicate that the same effect is obtained with isoprene.

It has been found, in accordance with the present invention, that the antioxidant compound is rendered more effective and will even reduce the concentration of peroxides at a fairly rapid rate when added to a hydrocarbon already containing such peroxides if a promoter is added which exhibits a standard oxidation potential between itself and its next higher oxidation stage in the range of about −0.7 to 0, measured in volts, the value being the single potential of the electrode when the concentration of ions involved is one molar (unit activity), referring to the hydrogen-hydrogen ion couple as zero, the measurements being taken at 25° C.

As illustrative of the effect of peroxides on the polymerization of diolefins, there will be described an investigation in which the polymerization of isoprene to a viscous liquid of rubber-like polymers was studied to observe the quantitative dependence of polymerization rate upon peroxide concentrations.

EXAMPLE 1

Measurements were made of the amount of polymerization of pure isoprene at a temperature of 60° C. in the presence of various quantities of the natural peroxide obtained by contacting isoprene with air. The quantity of peroxide present is indicated by the amount of active oxygen present. The results are shown in Table I.

TABLE I

Peroxide catalyzed polymerization of pure isoprene at 60° C.

| Active Oxygen | Duration | Per Cent per Hour to High Polymers [1] |
|---|---|---|
| P. P. M. | Hours | |
| 50 | 208 | 0.0091 |
| 100 | 137 | 0.0216 |
| 200 | 124 | 0.0434 |

[1] Calculated by subtracting rate of dimer formation.

The rate of formation of peroxides by the contact of hydrocarbons with air has been studied. The opportunities of higher boiling hydrocarbons coming into contact with air in the process of handling in the plant are particularly great. The fact that the vapor pressures may be less than one atmosphere at ordinary temperature provides on occasion a partial vacuum into which air is easily drawn. The C₅ hydrocarbons are known to be excellent solvents for oxygen.

EXAMPLE 2

The rate of peroxidation of pure (96%) isoprene when maintained saturated with air at ordinary temperatures in a darkened glass vessel was determined. Data are given in Table II.

TABLE II

*Rate of peroxidation of isoprene by air*

| Time, Hrs. | Active Oxygen Content, parts per million |
|---|---|
| 16 | 18 |
| 44 | 130 |
| 65 | 230 |
| 93 | 550 |
| 112 | 970 |

From the data of Example 2 it is apparent that the peroxidation is auto-catalytic, i. e., the presence of peroxide catalyzes further peroxidation.

Studies were then made of the effect of various antioxidants on the rate of polymerization of isoprene in the presence of added peroxide.

EXAMPLE 3

Inhibition of the polymerization of isoprene in the presence of natural peroxides was studied at 60° C., using 0.22% alpha naphthol, with and without the presence of methylene blue chloride (0.03%) as a promoter. In all cases the peroxide was present in an amount which provided 100 parts per million of active oxygen. Glass vessels were used. The results are shown in Table III.

TABLE III

*Inhibition of polymerization of isoprene at 60° C. (in the presence of approx. 100 P. P. M. of active oxygen)*

| Substance Added [1] | Duration, Hours | Per Cent Per Hour to High Polymers [1] | Percent Inhibition [2] |
|---|---|---|---|
| None | 122 | 0.0156 | 0 |
| Alpha naphthol | 189 | 0.0135 | 13 |
| Alpha naphthol + methylene blue chloride | 189 | 0.0041 | 74 |

[1] Calculated by subtracting rate of dimer formation.
[2] Percentage inhibition=$100 - \frac{\text{Rate in presence of inhibitor} \times 100}{\text{Rate in absence of inhibitor}}$ With regard to the effect of antioxidants on peroxides, studies have shown that the reduction of peroxides by certain antioxidants used alone is surprisingly low. Tests were made of the rate of peroxide reduction in an aromatic hydrocarbon solution at 80° and 110° C., the reduction in the presence of antioxidant alone being compared with the same amount of antioxidant in combination with (1) methylene blue chloride and (2) stannous chloride.

EXAMPLE 4

Results of the comparison of effect of tert.-butyl catechol and alpha naphthol on the reduction of tert.-butyl hydroperoxide and isoprene peroxide in aromatic hydrocarbon solution for a period of five hours for each test, with and without promoter, are shown in Table IV.

TABLE IV

*Reduction of peroxides*

| Temp., °C. | Peroxide [1] | Vessel | Reductor [2] | Promoter [3] | Velocity Constant, $K_1$ [4] |
|---|---|---|---|---|---|
| 80 | tert.-Butyl hydroperoxide | Glass | None | None | 0.00 |
|  |  |  | tert.-Butyl catechol | do | 0.00 |
|  |  |  | do | Methylene blue chloride | 0.25 |
|  |  |  | do | SnCl$_2$ | 1.2 |
| 80 | Isoprene peroxide | do | None | None | 0.00 |
|  |  |  | tert.-Butyl catechol | do | 0.00 |
|  |  |  | None | Methylene blue chloride | 0.00 |
|  |  |  | tert.-Butyl catechol | do | 0.19 |
| 110 | tert.-Butyl hydroperoxide | Steel | None | None | 0.00 |
|  |  |  | Alpha naphthol | do | 1.0 |
|  |  |  | do | Methylene blue chloride | 2.0 |

[1] Initial concentration=100 P. P. M. active oxygen.
[2] 0.22 wt. per cent concentration in each case.
[3] Concentration 0.03 wt. per cent.
[4] $K_1 = \frac{\log(100/c)}{t}$
where c=active oxygen concentration in P. P. M. at time $t$ in hours.

It will be noted that tert.-butyl catechol was ineffective for reducing the concentration of peroxide during the period of the test, which was five hours, but that rapid reduction was caused by adding an activator in the form of methylene blue chloride or stannous chloride. The promoter alone did not cause reduction. A similar effect was observed with alpha naphthol.

The antioxidants which have been found to be most effectively activated by the promoters of the present invention are the phenolic type antioxidants, by which is to be understood not only phenols and alkylated phenols, but also the polyhydroxy benzenes, as well as hydroxylated naphthalenes, such as naphthols. Examples of such antioxidants which are particularly useful are the cresols, catechol, hydroquinone, pyrogallol, the naphthols, and their alkylated derivatives. Since the exact mechanism of the action of the invention is not known, it may find application to other antioxidants such as those containing nitrogen and/or sulfur.

As stated above, the promoters which have been used in conjunction with the aforesaid phenolic type antioxidants are compounds exhibiting a standard oxidation potential of about −0.7 to about 0, measured as described above. Examples of promoters of this class which are especially useful in accordance with the present invention are the following, listed with the electrode reaction involved and the corresponding standard oxidation potential:

| Promoter | Electrode Reaction | Standard Oxidation Potential |
|---|---|---|
| Titanous chloride | $Ti^{+++}+H_2O = TiO^{++}+2H^++e^-$ | −0.1 |
| Hydrogen sulfide | $H_2S = S+2H^++2e^-$ | −0.14 |
| Stannous chloride | $Sn^{++} = Sn^{++++}+2e^-$ | −0.15 |
| Cuprous oxide | $Cu^+ = Cu^{++}+e^-$ | −0.17 |
| Mercurous chloride | $2Hg+2Cl^- = Hg_2Cl_2+2e^-$ | −0.27 |
| Trivalent vanadium salts | $V^{+++}+H_2O = VO^{++}+2H^++e^-$ | −0.31 |
| Uranous salts | $U^{++++}+2H_2O = UO_2^{++}+4H^++2e^-$ | −0.41 |
| Platinous salts | $PtCl_4^- +2Cl^- = PtCl_6^- +2e$ | −0.4 |
| Sulfur | $S+3H_2O = H_2SO_3+4H^++4e^-$ | −0.45 |
| Pentavalent molybdenum salts | $MoO^{+++}+2H_2O = MoO_3+4H^++e^-$ | −0.5 |
| Methylene blue chloride | Methylene white = methylene blue+$2H^++2e^-$ | −0.53 |

The promoter should be present in an amount equal to at least 10% of the weight of the antioxidant; and the amount of the antioxidant which it is most desirable to use is about twice the theoretical amount required for reduction of the peroxide present.

The invention should not be considered as limited by any of the examples which are set forth above for illustrative purposes only, but is to be limited solely by the terms of the appended claims.

We claim:
1. A diolefin containing dissolved therein a small amount of a phenolic type antioxidant and a small amount of methylene blue chloride.
2. Isoprene containing dissolved therein a small amount of a phenolic type antioxidant and a small amount of methylene blue chloride.
3. A diolefin containing dissolved therein a small amount of tert.-butyl catechol and a small amount of methylene blue chloride.
4. Isoprene containing dissolved therein a small amount of tert.-butyl catechol and a small amount of methylene blue chloride.
5. A composition containing a diolefin and dissolved therein a small amount of tert.-butyl catechol with a small amount of methylene blue chloride.
6. The method of reducing the peroxide content of a predominantly diolefinic hydrocarbon material containing peroxides in a proportion which tends to cause polymerization of the diolefinic hydrocarbon material, comprising the steps of heating said material in the presence of a small amount of a phenolic type anti-oxidant and a small amount of methylene blue chloride.

RICHARD F. ROBEY.
JOHN FEDIRKO.
ALLAN E. BARNETT.

REFERENCES CITED

The following references are of record in the file of this patent:

UNITED STATES PATENTS

| Number | Name | Date |
|---|---|---|
| 1,884,431 | Watson et al. | Oct. 25, 1932 |
| 2,006,756 | Bartram | July 2, 1935 |
| 2,023,110 | Wilson | Dec. 3, 1935 |
| 2,031,917 | Winning et al. | Feb. 25, 1936 |
| 2,115,781 | Morrell | May 3, 1938 |
| 2,288,754 | Story | July 7, 1942 |
| 2,361,538 | Franz | Oct. 31, 1944 |
| 2,398,468 | Schulze et al. | Apr. 16, 1946 |

OTHER REFERENCES

Cohen: Symposia on Quantitative Biology, vol. 1, 195–202 (1933).
Lowry et al.: Jour. Eng. Chem. vol. 27, 413–415 (1935).